United States Patent [19]
Wagner

[11] Patent Number: 6,092,102
[45] Date of Patent: Jul. 18, 2000

[54] SYSTEM AND METHOD FOR NOTIFYING USERS ABOUT INFORMATION OR EVENTS OF AN ENTERPRISE

[75] Inventor: Michael M. Wagner, Squirrel Hill, Pa.

[73] Assignee: University of Pittsburgh of the Commonwealth System of Higher Education, Pittsburgh, Pa.

[21] Appl. No.: 08/957,041

[22] Filed: Oct. 24, 1997

[51] Int. Cl.$^7$ .......................... G06F 15/16; G06F 15/173
[52] U.S. Cl. ...................... 709/206; 709/224; 340/825; 340/825.44
[58] Field of Search .................................. 709/206, 224; 340/825, 825.44

[56] References Cited

U.S. PATENT DOCUMENTS

| | | | |
|---|---|---|---|
| 5,555,191 | 9/1996 | Hripcsak | 364/514 R |
| 5,748,884 | 5/1998 | Royce et al. | |

OTHER PUBLICATIONS

Hripcsak, G., Monitoring the Monitor: Automated Statistical Tracking of a Clinical Event Monitor; *Computers and Biomedical Research*, vol. 26, pp. 449–466 (1993).

Wagner, M. et al., Decision–Theoretic Information Pretrieval: A Generalization of Reminding, Section of Medical Informatics, University of Pittsburgh, pp. 512–516, AMIA, Inc. (1994).

Hripcsak, G. et al., Design of a Clinical Event Monitor, *Computers and Biomedical Research*, vol. 29, pp. 194–221 (1996).

Wagner, M. et al., Evaluation of a Belief–Network–Based Reminder System That Learns from Utility Feedback, 19th Symposium on Computer Applications in Medical Care, 7 pp. (Nov. 1995).

Hiltz, F. et al., Coverage List: A Provided–Patient Database Supporting Advanced Hospital Information Services, Department of Information Systems, Brigham and Women's Hospital, pp. 809–813, AMIA, Inc. (1994).

Kuperman, G. et al., Detecting Alerts, Notifying the Physician, and Offering Action Items: A comprehensive Alerting System, Center for Applied Medical Information Systems Research, Brigham and Women's Hospital, pp. 704–708, AMIA, Inc. (1996).

Standard Specification for Defining and Sharing Modular Health Knowledge Bases (Arden Syntax for Medical Logic Systems), American Society for Testing and Materials, Designation: E 1460–92, pp. 1–49 (Apr. 1992).

*Primary Examiner*—Krisna Lim
*Attorney, Agent, or Firm*—Kirk D. Houser; Arnold B. Silverman; Eckert Seamans Cherin & Mellott, LLC

[57] ABSTRACT

The invention provides a system for notifying intended recipients, such as clinicians, about information or events of a medical enterprise, such as a hospital. The system includes an information processing system for receiving information as received information. A database stores the received information as stored information. A clinical event monitor employs the stored information for determining an event and generating a responsive message. A plurality of communication channels, such as e-mail or pager communication channels, may be employed to communicate the message. A notifier function cooperates with the clinical event monitor and selects one or more of the communication channels to communicate the message as a function of the type of message and a user's preference for one or more communication channels to communicate that message. The notifier function may include a database for storing the message types and preferences of the users, and may also include a graphical user interface for modifying the same. Associated method is also disclosed.

48 Claims, 5 Drawing Sheets

FIG. 5
PRIOR ART

```
Date: FRI., 24 OCT 1997
From: NOTIFIER <notifier@thor.cbmi.upmc.edu>
To: housestaffer@med.pitt.edu
Subject: RESULT[60]: Radiology report DOE JANE M mrn:123-45-6789
EXAM: CT SCAN OF THE HEAD WITHOUT CONTRAST
DATE: 199710241723

IMPRESSION: 1. PUNCTATE AREAS OF INCREASED SIGNAL ABNORMALITY ON A
T2-WEIGHTED BASIS INVOLVING THE WHITE MATTER. THESE ARE NONSPECIFIC
AND MAY REPRESENT ISCHEMIC CHANGE VS. DEMYELINATION. CLINICAL
CORRELATION IS SUGGESTED. 2. BILATERAL MAXILLARY SINUS DISEASE
```

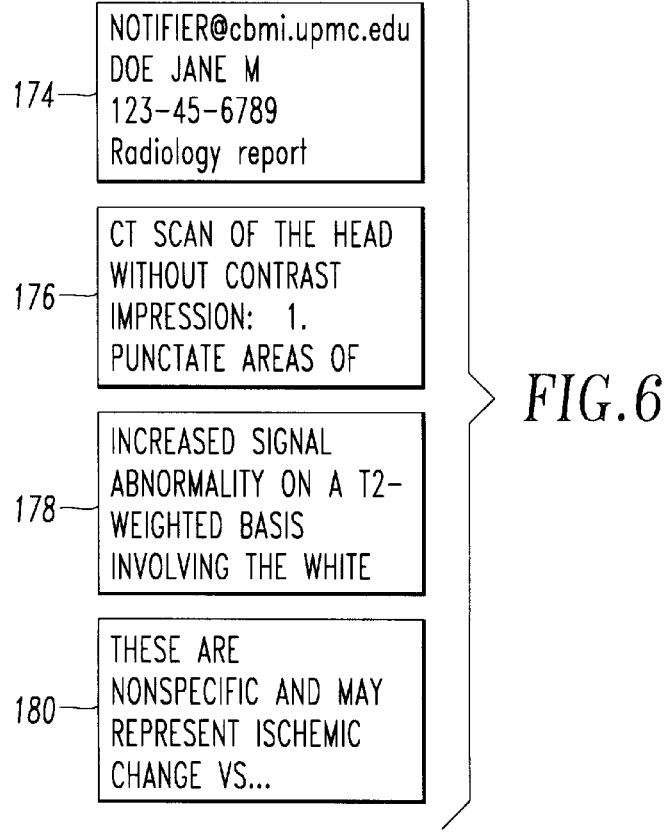

FIG. 6

SYSTEM AND METHOD FOR NOTIFYING USERS ABOUT INFORMATION OR EVENTS OF AN ENTERPRISE

BACKGROUND OF THE INVENTION

1. Field of the Invention

The present invention relates to an improved method for managing the delivery of information within an enterprise and, more specifically, it relates to a method for notifying users about information or events of the enterprise, and, most specifically, it is particularly advantageous in selecting one or more communication channels to communicate messages from an event monitor. The invention also relates to an improved system for notifying users about information or events of the enterprise.

2. Description of the Prior Art

An event monitor looks for specific patterns in data, which define types of events, being passed to it from a data store, such as a data warehouse or database. Typically, if the event monitor finds a pattern in the data (i.e., an "event"), the event monitor evokes an inference engine, such as a rule-based expert system.

A clinical event monitor refers to an embedded expert system in the domain of clinical medicine. Clinical event monitoring may be classified as synchronous (e.g., the expert system runs in response to data entered by a clinician in real time, as in order entry) or asynchronous (e.g., all other circumstances, for example, when it is triggered by the arrival of laboratory results).

A clinical event monitor evaluates events, in the context of information that may be known about a patient, and communicates conclusions via a communication channel to a user. The basic infrastructure needed to support event monitoring is a source of events, a source of patient data and a notification service. The event monitor itself is an algorithm that takes as input events, patient data and a representation of medical knowledge in various formats (e.g., rules), and outputs messages.

An event is data that triggers the execution of an event monitor. Events may be classified into four types: atomic, compound, atomic temporal and compound temporal. An atomic event is an event for which there is a 1-to-1 correspondence with external data. For example, in many systems the storage of a new laboratory result is an identifiable data event that corresponds to an event of interest to domain experts.

A compound event is defined by a static pattern in data. For example, the event that an elderly patient is admitted to the hospital may be of interest to a domain expert, but it does not correspond to a single data event. The detection of compound events does not require that the event detector maintain a persistent store of its own.

An atomic future event is an atomic event, usually created by the event monitor itself, that causes an inference algorithm to run at some time in the future (e.g., an event monitor schedules a check for the existence of a gentamicin level 48 hours after the start of gentamicin). To implement atomic future events, an event monitor has access to a persistent data store.

A compound temporal event is a sequence of data that, when recognized, causes the inference engine to run. Compound temporal events employ both persistent storage and algorithms that recognize temporal patterns. The typical locus for most temporal inference is within the expert system, not at the level of event, although there is a need to map from temporal patterns in the data to events of interest for knowledge users.

Typically, legacy systems rarely produce data that support 1-to-1 mappings to events; hence, many events are compound temporal events. For example, the storage of an HL-7 transaction of a potassium result from a laboratory into a database is not considered to be an atomic event because it could be a duplicate. Only after an algorithm checks this datum against a persistent store of transactions to ensure that it has not been processed earlier, is it considered an event. Another example of a compound temporal event is in the area of drug monitoring where an event of interest to a domain expert is whether the dose of a medication has changed. This event cannot be seen directly in the data. Instead, it must be deduced from a sequence of records in which the meditation is discontinued then restarted at a different dose.

Clinical event monitors are employed to improve the quality and lower the cost of health care by providing information to health care providers as they need it. The clinical event monitor may warn a provider about a medication because of an allergy, drug interaction or side effect. It may also interpret a laboratory test, remind a provider about following up on a screening test, or suggest a diagnosis or new treatment option. The clinical event monitor may coordinate a complex clinical protocol, making sure that each provider is aware of his or her part in that protocol. The goal of a clinical event monitor is not to replace the health care provider, but to make his or her job easier.

An example of a clinical event monitor is discussed in Hripcsak, G., et al., "Design of a Clinical Event Monitor," *Computers and Biomedical Research*, Vol. 29, pp. 194–221 (1996). As stated in the Hripcsak et al. article, a message from a clinical event monitor may be sent to a provider, depending on the urgency of the message, the availability of the provider and knowledge of who to send the message to, by electronic mail, through an alpha-numeric paging system, through an electronic patient record, via a facsimile machine, over surface mail or through a human intermediary. If the provider does not acknowledge that a message was received, then an alternate route may be chosen. A message may instead go to a patient or the patient's family. Messages may be stored in the patient record or routed to a particular individual. In most systems, messages that are routed to an individual are also stored in a patient database as a legal record. Computer-generated voice messages can be sent automatically by the event monitor. A printed report may be mailed or inserted into the paper chart for a patient. A message may be integrated into the clinical information system, appear on a terminal at the patient's location (e.g., an intensive care unit (ICU) terminal), appear to a user when he or she logs on to the system, or be attached to relevant patient data (e.g., the event data that caused a rule to be triggered). An urgent message might be sent by pager, whereas a passive informational message may simply be attached to the chart.

As shown in FIG. 2 of the Hripcsak et al. article, Medical Logic Module (MLM) rules in the clinical event monitor are written in an Arden Syntax and employ Arden write statements to send messages.

Hripcsak U.S. Pat. No. 5,555,191 discusses various prior art references regarding clinical event monitors, one of which employs the Arden Syntax MLMs. Whenever a medical event occurs, the MLMs that are pertinent to that event are triggered. The MLMs read data from the hospital database, test a set of criteria and, if those criteria are satisfied, perform some action such as sending a message via electronic-mail, storing a message in the patient database or triggering other MLMs.

U.S. Pat. No. 5,555,191 also discloses an automated statistical tracking device designed to detect malfunctions in three separate systems including a clinical event monitor, a patient registration system and a laboratory system, each of which generates messages. These systems also store their respective messages in three log files for the statistical tracking device.

It is known to employ the selective dissemination of information in which computer systems filter new information (e.g., by employing the Boolean combination of keywords, such as, "word1" AND "word2") on behalf of users, and collect user relevance feedback to refine the filters.

It is also known to employ intelligent agents, such as computer programs called agents, to filter information on behalf of users. For example, a user of the Internet may specify to such an agent the user's interest in new web pages concerning a specified topic. As new web pages concerning that topic become available on the Internet, the agent sends an e-mail message to the user to provide notification of the availability of the new web page.

Although various types of actions and communication channels are available to the rules of the clinical event monitor, there is room for improvement.

SUMMARY OF THE INVENTION

The present invention provides an improved system and method for notifying users about information or events of an enterprise by incorporating user preferences for communication channels to communicate a message as a function of the message, such as based on the message type. The system includes means for receiving information as received information; means for storing the received information as stored information; event monitoring means employing the stored information for determining an event and generating a message; a plurality of communication channels for communicating the message; and notifier means cooperating with the event monitoring means for selecting at least one of the communication channels to communicate the message as a function of the message and a user's preference for the at least one of the communication channels to communicate the message.

Preferably, the event monitoring means has means for generating the message with a plurality of message types; and the notifier means has database means for storing at least some of the message types and preferences of the users for one of the communication channels to employ with one of the at least some of the message types. As an additional refinement, the notifier means further has means for modifying the at least some of the message types and the preferences of the users in the database means of the notifier means.

As another refinement, the database means includes a plurality of dimensions for storing preferences of the users for the communication channels as a function of representations of the communication channels, the users, the at least some of the message types, and at least one argument selected from the group consisting of: time of day, and the user's role in the enterprise.

The invention also provides an improved method for notifying users about information or events of an enterprise. The method includes receiving information as received information; storing the received information as stored information; employing the stored information for determining an event and generating a responsive message; employing a plurality of communication channels for communicating the message; and selecting at least one of the communication channels to communicate the message as a function of the message and a user's preference for the at least one of the communication channels to communicate the message.

A preferred refinement includes generating partial delivery instructions for the message; and employing one of the following in the partial delivery instructions: (a) at least one of the communication channels to communicate the message, (b) at least one user to receive the message over the at least one of the communication channels, and (c) information corresponding to at least one user to receive the message over the at least one of the communication channels. The partial delivery instructions are employed for selecting one of: (a) the at least one of the communication channels to communicate the message, and (b) the at least one user to receive the message over the at least one of the communication channels.

Another refinement includes defining the at least one of the communication channels to communicate the message with the partial delivery instructions; and employing the partial delivery instructions for selecting the at least one user to receive the message over the at least one of the communication channels.

A further refinement includes defining the at least one user to receive the message over the at least one of the communication channels with the partial delivery instructions; and employing the partial delivery instructions for selecting the at least one of the communication channels to communicate the message.

Still another refinement includes defining the information corresponding to the at least one user to receive the message over the at least one of the communication channels with the partial delivery instructions; and employing the partial delivery instructions for selecting the at least one of the communication channels to communicate the message.

Preferably, the messages are generated with a plurality of message types; and at least some of the message types and preferences of the users for one of the communication channels to employ with one of the at least some of the message types are stored in a database. As a further refinement, the database is employed for storing the preferences as a function of representations of the communication channels, the users, the some of the message types, and at least one argument selected from the group consisting of: time of day, and the user's role in the enterprise.

As another refinement, at least one characteristic with a plurality of states is employed with each of the communication channels. A first database is employed with a plurality of dimensions for storing the user's preference for the communication channels as a function of at least the user, some of the message types, and the at least one characteristic of each of the communication channels. Preferences of the users are stored in the first database for at least one of the states of the at least one characteristic of each of the communication channels to employ with at least some of the message types. The preferences of one of the users are retrieved from the first database for one of the at least some of the message types. A second database is employed with two dimensions for storing representations of the communication channels as a function of the at least one characteristic of each of the communication channels. The preferences of the one of the users are employed to retrieve at least one representation of the communication channels from the second database.

The invention further provides a system for notifying users about events of an enterprise having information. The system includes event monitoring means employing the information of the enterprise for determining an event and generating a message having one of a plurality of types; a plurality of communication channels for communicating the message; and notifier means cooperating with the event monitoring means for selecting zero or at least one of the communication channels to communicate the message as a function of a user's preference for the type of the message and the communication channels to communicate the message.

The invention still further provides a notifier for use with an event monitor to notify users about an event of an enterprise. The event monitor determines the event and generates a message responsive thereto. The notifier includes means for receiving the message from the event monitor; a plurality of communication channels for communicating the message; and means for selecting at least one of the communication channels to communicate the message as a function of the message and a user's preference for the at least one of the communication channels to communicate the message.

It is an object of the present invention to provide a system and method which accommodates user preferences for the communication of information to them.

These and other objects of the invention will be more fully understood from the following detailed description of the invention on reference to the illustrations appended hereto.

BRIEF DESCRIPTION OF THE DRAWINGS

FIG. 5 is a sample message communicated to a user by e-mail.

FIG. 6 shows sample sub-messages communicated to a user by pager.

DESCRIPTION OF THE PREFERRED EMBODIMENTS

As employed herein, the term "enterprise" shall expressly include, but not be limited to, any for-profit or not-for-profit organization or business employing and disseminating information for decision making such as, for example, industrial processes; corporations; universities; medical enterprises, such as hospitals, clinics and doctor's offices; and/or other business processes.

As employed herein, the term "message" shall expressly include, but not be limited to, information generated by an event monitor for communication to a user in any manner (e.g., by facsimile; datalink; paging system; e-mail system; tele-communication system; local-area network; wide-area network; the Internet; other communication channels, such as fiber optic, electromagnetic, radio-frequency and electronic channels; other communication mechanisms providing output to the user, such as audible, tactile, visual, printed or displayed).

As employed herein, the term "clinician" shall expressly include, but not be limited to, doctors, residents, interns, consultants, registered nurses, practical nurses and nurse practitioners.

As employed herein, the term "patient" shall mean human beings and other members of the animal kingdom.

Figure 1:
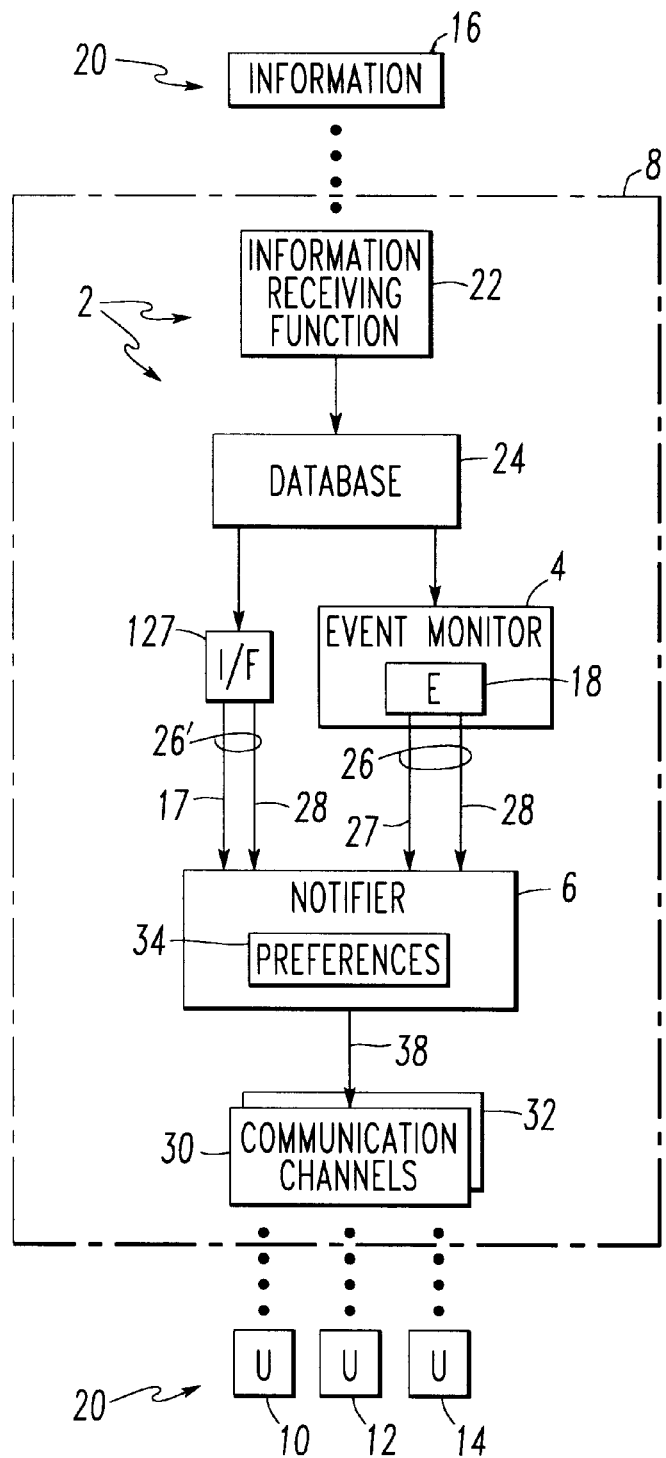
FIG. 1 is a simplified block diagram of an information processing system, an event monitor and a notifier function in accordance with the present invention.

FIG. 1 is a simplified block diagram of an information processing system 2, an event monitor 4 and a notifier function 6 which form a notification system 8. The system 8 notifies users (U) 10,12,14 about information 16,17 or events (E) 18 of an enterprise 20. For purpose of illustration, but not limitation, the exemplary information processing system 2 is a hospital information system; the event monitor 4 is a clinical event monitor; the enterprise 20 is a medical enterprise, such as a hospital enterprise; and the information 16 is data captured about a patient of the hospital enterprise 20, although the invention is applicable to a wide range of information processing systems, event monitors and information associated with a variety of enterprises.

The notification system 8 includes an information receiving function 22 of the information processing system 2 for receiving the information 16 as received information; a database or data warehouse 24 of the information processing system 2 for storing the received information as stored information; the clinical event monitor 4 which analyzes the stored information to determine an event (E) 18 and generate an alert 26 including a message data structure 27 having a message, and partial or complete delivery instructions 28; plural communication channels 30,32 for communicating the message of the data structure 27 to one or more of the users 10,12,14; and the notifier function 6 which cooperates with the clinical event monitor 4.

As discussed in greater detail below in connection with FIG. 4, the notifier function 6 employs the message of the data structure 27 and the delivery instructions 28 to select one or more of the communication channels 30,32 to communicate the message as a function of the message and preferences 34 of the users 10,12,14 for the one or more communication channels 30,32 to communicate the message.

The preferences 34 include, among others, a mapping of message types to preferred communication channels 30,32 for each of the users 10,12,14. As discussed in greater detail below in connection with FIGS. 2 and 4, functions 36 may be employed to select one or more of the users 10, 12,14 to receive the message of the data structure 27 over one or more of the communication channels 30,32. The functions 36 include, among others, a mapping of message types with respect to some or all of the users 10, 12,14. In the simplest example, the delivery instructions 28 define both the user(s) and the communication channel(s) to be employed by the notifier function 6 in communicating the message. Important aspects of the notifier function 6 are for the cases when the user(s) or the communication channel(s) are either: (1) undefined, or else (2) incompletely or partially defined. The notifier function 6 employs the preferences 34 and/or the functions 36 to resolve the missing, incomplete or partial definition of the user(s) or the communication channel(s), and then communicates a suitably formatted user message 38 to the appropriate user(s) by employing the appropriate communication channel(s).

Figure 2:
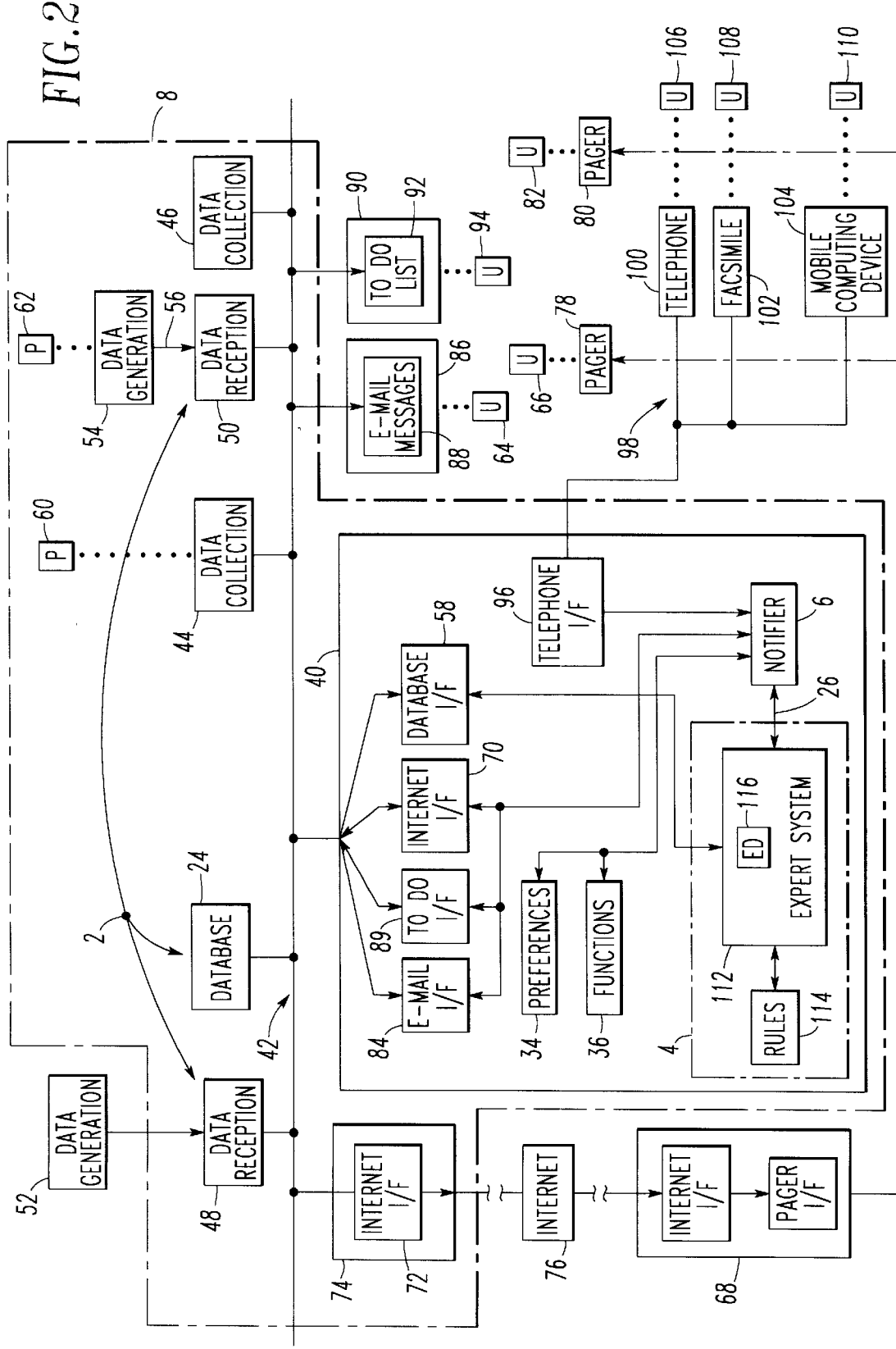
FIG. 2 is a block diagram of the hardware and software components of a notification system in accordance with the invention.

Referring to FIG. 2, a block diagram of the hardware and software components of the exemplary notification system 8 is illustrated. The database 24 is interconnected with a workstation 40, such as an exemplary SPARC Station running SunOS 4.3 marketed by Sun Microsystems, by a communication network 42, such as an Ethernet local-area network. It will be appreciated that while reference has been made to the exemplary workstation 40, a wide range of other processors such as, for example, mainframe computers, mini-computers, personal computers, microcomputers, and other microprocessor-based computers may be employed. Similarly, it will be appreciated that a wide range of other communication networks such as, for example, FDDI or a wide-area network may be employed.

The information processing system 2 includes one or more data collection sub-systems 44,46 and data reception sub-systems 48,50. In the exemplary embodiment, the data reception sub-system 48 receives information from a data generation sub-system 52, such as a service which provides newly published articles (e.g., from newspapers, magazines, medical journals) or the clinical information system of an affiliated enterprise, external to the hospital enterprise 20 of FIG. 1, that provides consulting reports and/or other patient record information; and the data reception sub-system 50 receives information from a data generation sub-system 54, such as a laboratory information system or radiology information system, internal to the hospital enterprise 20. Other non-limiting examples of the data collection sub-systems 44,46 include pharmacy information systems, hospital admissions information systems, administrative information systems, and point of care systems, which both generate and receive information within the hospital enterprise 20. It will be appreciated that a wide range of information processing systems, data collection sub-systems and data reception sub-systems for a variety of enterprises may be employed. Preferably, the sub-systems 44,46,48,50 are processor based and employ suitable open protocols, such as TCP/IP, for communication with the database 24 over the communication network 42.

For example, the exemplary laboratory information system 50 receives the result 56 of a serum potassium determination from data generation sub-system 54, such as an automatic analyzer 54. After the value of the potassium test is permanently stored in the database 24 of the information processing system 2, that system 2 sends the result 56 through database interface (I/F) 58 of the workstation 40 to the event monitor 4 which analyzes the result 56. The event monitor 4 creates the alert 26, including the message data structure 27 and delivery instructions 28 of FIG. 1, and sends the alert 26 to the notifier function 6. The message of the data structure 27 is an interpretation of the result 56 and the delivery instructions 28 provide for the sending of the interpretation to the appropriate recipient(s) by the appropriate communication channel(s).

Referring to FIGS. 1 and 2, for the exemplary hospital enterprise 20, there are a plurality of patients 60,62 from which some of the information 16 originates, and the recipients, such as users 64,66 of the information 16, are clinicians for the patients 60,62. Typically, the message of the data structure 27 pertains to one of the patients 60,62 and is communicated to one or more of the clinicians 64,66. The notifier function 6 employs one or more of the communication channels 30,32 for communicating the message.

For example, as shown in FIG. 2, a communication channel for a paging system 68 is provided by Internet interface (I/F) 70 of the workstation 40 which communicates with Internet I/F 72 of workstation 74 over the communication network 42. The Internet I/F 72 of workstation 74, in turn, interfaces the communication network 42 with the Internet 76 and, thus, with remote paging system 68. The paging system 68, such as a SkyTel paging system, interfaces with pagers 78,80 of users 66,82, respectively. Although Internet communications with the paging system 68 are illustrated, it will be appreciated that other forms of communication such as, for example, e-mail over a wide-area network may be employed.

An exemplary communication channel for e-mail is provided by e-mail interface (I/F) 84 of the workstation 40 which communicates with workstation 86 over the communication network 42 to provide e-mail messages 88 to the user 64. An exemplary communication channel for a ToDo list is provided by ToDo interface (I/F) 89 of the workstation 40 which communicates with an application of server 90 over the communication network 42 to update the ToDo list 92 of the user 94. Other telephone or tele-communication channels for voice, facsimile and data are provided by telephone interface (I/F) 96 of the workstation 40 which communicates with a telecommunication system 98 and telephone 100, facsimile 102 and mobile computing device 104, such as a personal digital assistant (PDA), of users 106,108,110, respectively.

Continuing to refer to FIG. 2, the exemplary clinical event monitor 4 includes an expert system 112 having rules 114 for interpreting the information 16 of FIG. 1. The expert system 112 of the event monitor 4 receives patient data from the database 24. In the most general terms, production systems such as the expert system 112 are composed of "IF condition THEN action" rules, called productions and a working memory which contains information. Essentially, the production system operates by matching the contents of the working memory (e.g., patient data and information about drugs coming out of the database 24) against the "condition" of a production, and then executing the action.

An event detector (ED) 116 of the expert system 112 looks for specific patterns in the data being passed to it from the database 24 and being maintained in the local working memory, which define types of events, such as, without limitation, atomic, atomic temporal and compound temporal. If ED 116 finds a pattern in the data (i.e., an "event"), the ED 116 evokes an inference engine, which in the exemplary embodiment is a public domain, forward chaining rule-based expert system shell based on CLIPS as developed by NASA. The input to the ED 116 is a stream of data coming from the database 24 and the output are events that are referred to in the rules 114 of the clinical event monitor 4.

Figure 3:
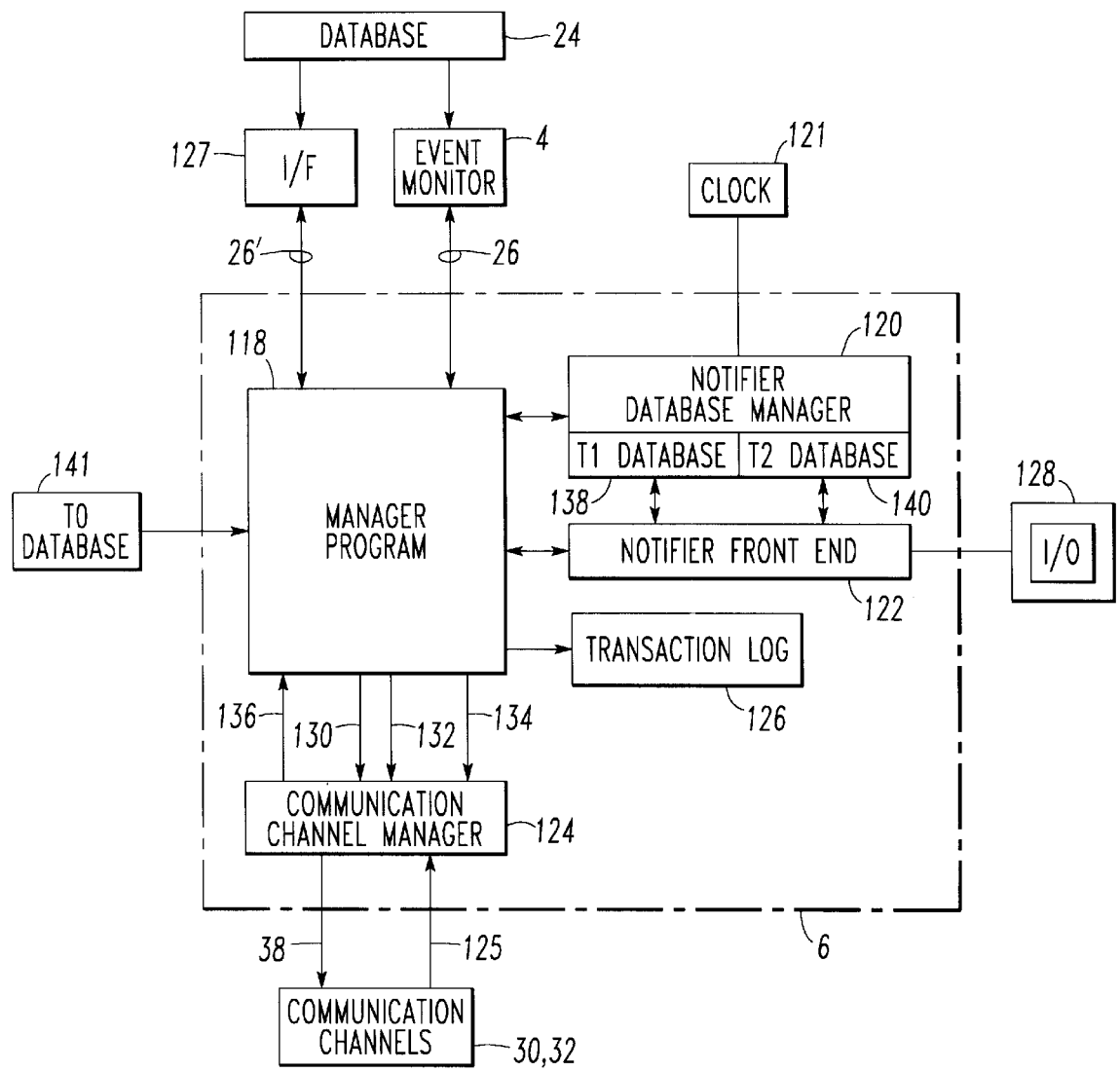
FIG. 3 is a block diagram of the notifier function of FIG. 1.

Referring to FIG. 3, a block diagram of the notifier function 6 includes a manager program 118, a notifier database manager 120, a notifier front end 122, and a communication channel manager 124. Also, the notifier function 6 preferably includes a transaction log of communicated information 126. The manager program 118 accepts alerts 26 having the message data structure 27 and delivery instructions 28 of FIG. 1, controls and coordinates the other notifier modules 120,122,124,126, and returns the success or failure of the communication to the calling system, such as the event monitor 4. The manager program 118 also accepts alerts 26', similar to the alert 26, about other information from an information interface (I/F) 127. As shown in FIG. 1, the alerts 26' include the information 17, similar to the message data structure 27, and the delivery instructions 28. For example, the database 24 may directly call the notifier function 6 through the information I/F 127 to provide a message, for example, about a new laboratory test result for appropriate communication to a clinician.

The notifier database manager 120 interfaces with various databases of the notifier function 6, such as the preferences 34 and functions 36 of FIG. 2. The notifier front end 122 is a user interface for the entry and modification of information, such as the preferences 34 or functions 36. Preferably, the notifier front end 122 provides a suitable graphical user interface (GUI) to I/O device 128, such as a display and keyboard and/or mouse, that permits a particular user, after security login, to modify the data in the preferences 34 and functions 36.

The communication channel manager 124 is a server whose role is to interface to particular communication channels 30,32 for communications such as, for example, to pagers 78,80, e-mail systems 88, applications that contain ToDo lists 92, telephones 100, facsimiles 102 and mobile computing devices 104, as discussed above in connection with FIG. 2. The communication channel manager 124 inputs the user message 130 to be communicated, the identity 132 of the user(s) of the message 130, and the identity 134 of the communication channel(s). Next, the communication channel manager 124 suitably calls the selected communication channels(s) 30,32 (e.g., an e-mail system using simple mail transfer protocol (SMTP), SkyTel paging service). Internally, the communication channel manager 124 employs tables of information that map from the identity of the user(s) of the message 130 to the address(es) employed by the communication channel(s). For example, the identity of one user (e.g., as coded in a unique number, such as 004655) is mapped to an e-mail address (e.g., "xyz@abc.defg.edu") and/or to a pager address (e.g., "123456@skytel.com"). Preferably, the identity of the user is encoded using an enterprise-wide user identification, such as a unique number (e.g., 004655), and one or more databases are employed to select the address(es) for specific communication channel(s). In this manner, the identity of the user(s) to receive the message 130 is suitably formatted for one or more of the communication channels 30,32. After the message 130 is communicated to the appropriate user(s), the communication channel manager 124 returns status 136 to the manager program 118.

The manager program 118 preferably maintains the transaction log of communicated information 126 in order to store a record of all information that was communicated corresponding to each message 130. The transaction log 126 includes the identity of the user(s) to receive the message 130; the time of day and date that the message 130 was communicated; the identity of the communication channel(s) employed to communicate the message 130; the contents of the message 130; and a unique numerical identification (e.g., the count from a counter incremented by the manager program 118 for each of the alerts 26,26') of the message 130 that was communicated. The log 126 may advantageously be employed for audit purposes within the notification system 8 of FIG. 1.

Table I shows the arguments, including their sub-arguments, employed in the call to the manager program 118 by the event monitor 4 or by the database 24 through the information I/F 127:

TABLE I

| ARGUMENTS | DATA TYPES | DEFINITIONS |
| --- | --- | --- |
| DEL_INST | structure | information about to whom to deliver a message, and by which communication channel(s) |
| RECIPIENT | string | list of one or more user IDs, or instructions to query databases to determine the user(s) |

TABLE I-continued

| ARGUMENTS | DATA TYPES | DEFINITIONS |
| --- | --- | --- |
| CHANNEL | string | list of one or more communication channels, or instructions to query databases to determine the communication channel(s) |
| MESSAGE_STR | structure | information about and components of a message |
| MT | long | message type or code representing the type of information in the message |
| ID | long | unique numeric identification generated for audit purposes |
| HEADER20 | string | header or subject of message formatted for a 20 character-wide channel |
| HEADER80 | string | header or subject of message formatted for an 80 character-wide channel |
| MSGBDY20 | string | body of alpha-numeric message formatted for 20 character-wide channel |
| MSGBDY80 | string | body of alpha-numeric message formatted for 80 character-wide channel |

The alert 26 includes both the delivery instructions 28 (DEL_INST) and the message data structure 27 (MESSAGE_STR) of FIG. 1. As shown in Table I, the delivery instructions 28 include information about to whom (i.e., RECIPIENT) to communicate a message, and by which communication channel(s) (i.e., CHANNEL). The sub-argument RECIPIENT may be a list of zero, one or more user identification numbers (IDs), or instructions to query databases to determine the user(s). The sub-argument CHANNEL may be a list of zero, one or more communication channels, or instructions to query databases to determine the communication channel(s). The argument MESSAGE_STR includes, in relevant part, various sub-arguments such as MT, which is the message type or code representing the type of information in the message; ID, which is the unique numeric identification generated for audit purposes; and suitable message headers and bodies for either 20 character-wide or 80 character-wide exemplary communication channels.

Table II shows exemplary values for the sub-arguments RECIPIENT and CHANNEL, which are discussed in greater detail below in connection with FIG. 4:

TABLE II

| SUB ARGUMENT | TYPE | EXEMPLARY VALUE |
| --- | --- | --- |
| RECIPIENT | | |
| | undefined | 0 |
| | user ID | 004655 |
| | list of user IDs | 004655\|001272 |
| | instructions to query a database: a 2-dimensional database which defines a user based on argument ARG (e.g., patient, account, MT) | TO(ARG) |
| CHANNEL | | |
| | undefined | 0 |
| | communication channel | e-mail |
| | list of communication channels | e-mail\|pager |

TABLE II-continued

| SUB ARGUMENT | TYPE | EXEMPLARY VALUE |
|---|---|---|
| | instructions to query database: an N-dimensional database which defines communication channel(s) based on the user, message type, and other arguments ARGs (e.g., time of day, role of user, setting, relationship to patient) | T1 (RECIPIENT,MT,ARGs) |
| | instructions to query database: two-tiered, N-dimensional database which defines communication channel(s) based on the user, message type, and other arguments ARGs (e.g., time of day, role of user, setting, relationship to patient), with a first tier providing characteristics, and a second tier returning communication channel(s) | T2 (RECIPIENT,MT,ARGs) |

The notifier database manager 120 includes a plurality of databases such as exemplary Type 1 (T1) database 138 and exemplary Type 2 (T2) database 140 which store preferences of the users for certain communication channels and preferences of the users for the characteristics of communication (e.g., reliability, time latency), respectively. The notifier front end 122 serves to enter or modify the databases 138,140 through the I/O device 128. Whenever the delivery instructions (DEL_INST) specify the communication channel (CHANNEL) as a Type 1 database (e.g., T1(RECIPIENT,MT,ARGs)), the notifier database manager 120 queries database 138 which is an N-dimensional database defining the communication channel(s) (CHANNEL) based on the user (RECIPIENT), the message type (MT) and other arguments ARGs (e.g., time of day, role of the user, setting of the patient within the hospital enterprise, relationship of the clinician or user to the patient). Also, whenever the delivery instructions (DEL_INST) specify the communication channel (CHANNEL) as a Type 2 database (i.e., T2(RECIPIENT, MT, ARGs)), the notifier database manager 120 queries database 140 which is a two-tiered, N-dimensional database defining the communication channel(s) based on the user, the message type and other arguments ARGs, such as those of the Type 1 database. The first tier provides one or more characteristics of the communication channel(s), and the second tier of database 140 returns the communication channel(s) (CHANNEL).

Table III shows an exemplary Type 1 preference matrix, such as employed by database 138, for a particular user. Two dimensions of the n-dimensional matrix are shown in Table III: (1) the communication channels; and (2) the type of information to be communicated. In this example, all lab tests, including drug level, potassium, and hematocrit tests, are communicated, for the particular user, using a 2-way fail-safe pager communication channel (e.g., the page is repeated until acknowledged); and a preference for non-communication of none, one or more of the message types (e.g., this particular user is not interested in receiving any new articles through any of the communication channels).

TABLE III

| Type of information | E-mail | Pager | 2-way fail-safe pager | ToDo list | Do not deliver |
|---|---|---|---|---|---|
| Lab tests | | | X | | |
| Drug level | | | | | |
| Potassium | | | | | |
| Hematocrit | | | | | |
| New articles | | | | | X |

Other dimensions (not shown in Table III) include time of day, role of the user (e.g., surgeon, primary doctor, pharmacist), setting of the user's patient (e.g., inpatient or outpatient of the medical enterprise, oncology floor patient, intensive care unit (ICU) patient) and relationship of the user to the patient (e.g., primary doctor, cross-cover doctor, resident, consultant). In addition to the exemplary preferences of Table III, it will be appreciated that the user might prefer e-mail or ToDo List communications at certain times of the day, and pager communication at other times. Similarly, surgeons may be interested in receiving only articles on new surgical techniques, while pharmacists may be interested in receiving only articles on new drugs. Similarly, if the alert 26 of FIG. 3 is regarding a particular patient, the user may prefer pager communications if the patient is in an inpatient setting and the user is the patient's primary doctor, and may prefer to receive e-mail communications if the patient is in an outpatient setting or the user is the cross-cover doctor.

Table IV shows a Type 2 preference matrix, such as employed by database 140, for a particular user. Type 2 is similar to Type 1 with the exception that the communication channels are not enumerated for the user. Instead, the user expresses his or her preference for the desired characteristics of communication for different types of information. This approach allows for the addition, deletion or replacement of communication channels with other communication channels without having to reacquire communication channels from users and reconfigure all preference matrices. When using a Type 2 preference matrix, a mapping from communication channel characteristics to communication channels is employed as discussed below in connection with Table V.

TABLE IV

| Type of information | Time latency | Fail-safe | Security | Delivery cost | Capacity |
|---|---|---|---|---|---|
| Lab tests | Immediate | Yes | Encrypted | | |
| Drug level | | | | | |
| Potassium | | | | | |
| Hematocrit | | | | | |
| New articles | Not Immediate | No | Not encrypted | Low | |

Table V shows an exemplary mapping from communication channel characteristics to communication channels.

TABLE V

| Communication Channels | COMMUNICATION CHANNEL CHARACTERISTICS | | | | |
| --- | --- | --- | --- | --- | --- |
| | Time latency | Fail-safe | Security | Delivery cost | Capacity |
| 2-way pager | Immediate | No | Encrypted | High | 512 Bytes |
| 2-way pager with fail-safe delivery | Immediate | Yes | Encrypted | High | 512 Bytes |
| E-mail | Not Immediate | No | Not encrypted | Low | "Unlimited" |
| ToDo list | Not Immediate | Yes | Encrypted | Low | "Unlimited" |

Whenever the delivery instructions (DEL__INST) specify the user (RECIPIENT) as a Type 0 database (T0(ARG)), the manager program 118 queries an external T0 database 141 which is a 2-dimensional database defining the user (RECIPIENT) based on the argument ARG. As a non-limiting example, a Type 0 database, such as database 141, may be advantageously employed in the case where an enterprise (e.g., a medical enterprise, such as a hospital), has a plurality of customers (e.g., patients) each of which has an account, the users are account administrators for the accounts, and the message pertains to the account of one of the customers (e.g., the patient has checked out of the hospital and further charges to the account have been suspended). The Type 0 database maps the account to the account administrator thereby facilitating the communication of the message to the appropriate account administrator for that account. Similarly, the Type 0 database may be employed to map patients to clinicians.

As another non-limiting example for a Type 0 database, some of the users may have at least one role (e.g., primary doctor for patient John Doe, surgeon for patient John Doe, account administrator for the account of patient Jane Doe) within the enterprise (e.g., a hospital), and the message may pertain to one of the roles (e.g., the doctors for patient John Doe) and be communicated to the user(s) having that role (e.g., both the primary doctor and the surgeon for patient John Doe).

As a further non-limiting example, a Type 1 database, such as database 138, may be advantageously employed in the case where the event monitor 4 generates messages with one of a plurality of message types (MTs). The T1 database 138, for each of the users, stores the message types as shown with "Type of information" in Table III along with user preferences for one or more of the communication channels to employ with particular message types. It will be appreciated that further refinements of user preferences may be based on time of day as read by the notifier database manager 120 from real time clock 121. For example, a user may specify the preference for the communication of a particular type of information, such as potassium results, by pager during certain hours of the day, and by e-mail at other hours. The preference database 138 contains mappings from types of information (e.g., potassium results) to interested users (e.g., Dr. Jones) to communication channel(s). In a Type 1 database, Dr. Jones' preference for the communication of potassium results by pager is represented directly.

In a Type 2 database, the characteristics (e.g., speed, reliability) of the communication of potassium results are represented for each of the users. Type 2 employs an additional representation of the characteristics of available communication channels as shown in Tables IV and V. A Type 2 database, such as exemplary database 140, may be advantageously employed in the case where each of the communication channels have at least one characteristic (e.g., speed or time latency; reliability or fail-safe operation; security; delivery cost; or capacity) with two or more states (e.g., immediate/not immediate; yes/no; encrypted/not encrypted; high/medium/low; or limited/unlimited, respectively).

The first tier of the Type 2 database, as shown in Table IV, is employed to store and retrieve preferences of the users for one or more of the states of the characteristics for each of the communication channels. A mapping is provided for those states/characteristics for at least some of the message types. The first tier of the Type 2 database includes a plurality of dimensions for storing the preferences as a function of representations of the communication channels, the users, the message types, and at least one characteristic of each of the communication channels. For example, in Table IV, for the communication of Lab tests, the user preferences for the characteristics (states) are: Time latency (Immediate), Fail-safe (Yes), and Security (Encrypted). It will be appreciated that the first tier of the database 140, similar to the database 138, may also store the user's preference for the communication channels as a function of the time of day, role of the user, the setting of the user's customer within the enterprise, and/or the relationship of the user to the customer.

The second tier of the Type 2 database is employed to retrieve at least one representation of the communication channels. The second tier includes two dimensions for storing representations of the communication channels as a function of the characteristics of the communication channels. For example, in Table V, for the user preferences for the characteristics (states) corresponding to "Lab tests" from Table IV, the communication channel "2-way pager with fail-safe delivery" is retrieved. The advantage of the database 140 is that as new communication channels become available, the preferences of users for communication of information do not have to be re-elicited or transformed in the first tier. Instead, a relatively simple change to the second tier may be made.

As shown in FIG. 3, for fail-safe communication channels, the communication channel manager 124 accepts an acknowledgement 125 of receipt of the message 38 from the user of the fail-safe communication channel. If the acknowledgement 125 is not provided by the user within a predefined time, then the message 38 is resent to the user and the process of checking for the acknowledgement 125 is repeated.

Figure 4:
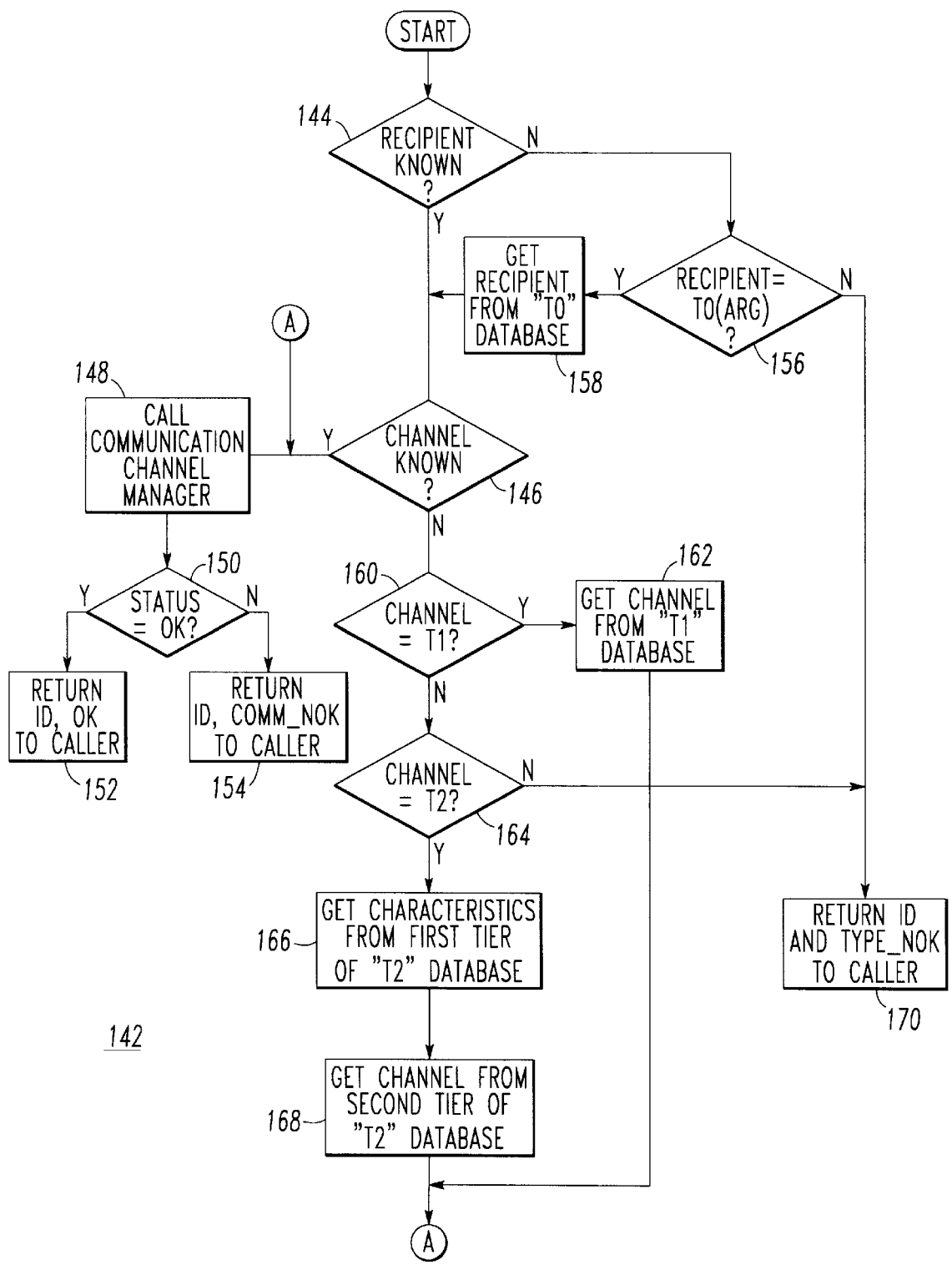
FIG. 4 is a flowchart of software employed by the notifier function of FIGS. 1 and 3.

FIG. 4 is a flowchart of a software routine 142 employed by the manager program 118 of the notifier function 6 of FIG. 3. At 144, if the RECIPIENT of the message is known (i.e., either a user ID or a list of user IDs is available, as set forth above in Table II), then execution resumes at 146. Next, at 146, if the CHANNEL for communicating the message is known (i.e., either a communication channel or a list of communication channels is available, as set forth above in Table II), then the delivery instructions (DEL__ INST) are complete and execution resumes at 148. There, a call to the communication channel manager 124 is made with the message 130 (e.g., MSGBDY20 or MSGBDY80 of Table I) to be communicated, the identity 132 (user ID or list of user IDs) of the user(s) of the message 130, and the identity 134 (communication channel or list of communication channels) of the communication channel(s) as shown in FIG. 3. At 150, if the status 136 from the communication channel manager 124 is OK, then, at 152, the ID and OK status are returned to the caller of routine 142. Otherwise, if the status 136 is not OK, then, at 154, the ID and a COMM__NOK status are returned to the caller.

On the other hand, if at 144 the RECIPIENT of the message is not known, then, at 156, it is determined whether the RECIPIENT of the message is defined by the T0 database 141. If so, then, at 158, the manager program 118 accesses the T0 database 141 to determine the RECIPIENT of the message (i.e., either a user ID or a list of user IDs) from the database 141, after which, execution resumes at 146 as discussed above. For example, if the delivery instructions (DEL_INST) include "coverage_list_database," the manager program 118 calls external database coverage_list_database with arguments provided in the delivery instructions (e.g., the name of the patient). In this example, database coverage_list_database provides a mapping from patients to responsible clinicians and returns to the manager program 118 the identity of the user(s) to notify.

Following 146, if the CHANNEL for communicating the message is not known, at 160, it is determined whether the CHANNEL of the message is defined by the T1 database 138. If so, at 162, the notifier database manager 120 accesses the Ti database 138 with the arguments RECIPIENT and MT, as well as any other arguments (ARGs) supplied with the delivery instructions (DEL_INST), to determine the CHANNEL (communication channel or list of communication channels), after which, execution resumes at 148.

On the other hand, if the CHANNEL of the message is not defined by the T1 database 138 at 160, then, at 164, it is determined whether the CHANNEL of the message is defined by the T2 database 140. If so, at 166, the notifier database manager 120 accesses the first tier of the T2 database 140 with the arguments RECIPIENT and MT, as well as any other arguments (ARGs) supplied with the delivery instructions (DEL_INST), to determine the characteristics (values) of the CHANNEL. Then, at 168, the notifier database manager 120 accesses the second tier of the T2 database 140 with the characteristics (values) to determine the CHANNEL (communication channel or list of communication channels), after which, execution resumes at 148.

On the other hand, if the tests at either 156 or 164 are false, then, at 170, the ID and TYPE_NOK status are returned to the caller of routine 142, as the delivery instructions (DEL_INST) were defective. Leading up to step 158, and as subsequently determined at step 146 leading to step 148, the delivery instructions (DEL_INST) for the message provided a partial definition (of the user(s) and communication channel(s)) in the form of the communication channel(s) to communicate the message. Leading up to step 162 or steps 166/168, the delivery instructions (DEL_INST) for the message provided a partial definition in the form of the user(s) to receive the message as determined previously at step 144. Leading up to step 162 or steps 166/168, the delivery instructions (DEL_INST) for the message provided a partial definition in the form of information corresponding to the user(s) to receive the message as determined previously at step 158. In those three cases, the partial delivery instructions are employed to select: (1) the communication channel(s) to communicate the message at steps 162 or 166/168; or (2) the user(s) to receive the message at step 158 over the communication channel(s) which are either: (a) known at steps 146/148, or (b) are later determined at steps 162 or 166/168.

FIG. 5 shows an exemplary 80-character report format 172 for e-mail and FIG. 6 shows exemplary 20-character report formats 174,176,178,180 for pager communication, with suitable user interaction employed to display the next report (e.g., 176) following the previously displayed report (e.g., 174).

Before the exemplary notification system 8, clinicians, such as interns, had to accept unwanted pages or else poll clinical systems periodically (e.g., by logging in to a workstation and searching for e-mail messages) to determine whether information on which further clinical management was contingent had become available. That mode of operation was wasteful of their time and, also, introduced delays and possible economic consequences into the process of care. As many communication channels (e.g., pagers) support mobile communications and interns are mobile workers who diagnose and manage medical problems, the notification system 8 permits interns to specify preferences for the types of messages and the types of communication channels to employ for optimum efficiency in receiving the results of tests while avoiding unwanted communications and unnecessary delays in waiting for such results.

Further, as interns typically want access to almost all types of laboratory results, the exemplary notification system 8 permits the interns to control which types of information they receive, and how that information is communicated to them, depending on the needs of their current setting within the medical enterprise.

The exemplary notification system 8 may advantageously be employed to centralize the dissemination of information and thereby optimize the usage of the communication channels of the enterprise to prevent duplication of notification, to prevent omission of notification, and to avoid overloading of the communication channels.

Whereas particular embodiments of the present invention have been described above for purposes of illustration, it will be appreciated by those skilled in the art that numerous variations in the details may be made without departing from the invention as described in the appended claims.

I claim:

1. A system for notifying users about information or events of an enterprise, said system comprising:
    means for receiving information as received information;
    means for storing the received information as stored information;
    event monitoring means employing the stored information for determining an event and generating a message;
    a plurality of communication channels for communicating the message; and
    notifier means cooperating with said event monitoring means for selecting at least one of said communication channels to communicate the message as a function of the message and a user's preference for said at least one of said communication channels to communicate the message.

2. The system of claim 1 including
    said means for receiving information having means for receiving the information from an entity external to said enterprise.

3. The system of claim 1 including
    said means for receiving information having means for generating the information within the enterprise, and means within the enterprise for receiving the information from said means for generating.

4. The system of claim 1 including
    said means for receiving information having means for generating and receiving the information within the enterprise.

5. The system of claim 1 including
    said means for storing the received information is an information system.

6. The system of claim 5 including said information system includes a database.

7. The system of claim 6 including said enterprise is a hospital enterprise; and said information system is a laboratory information system for the hospital enterprise.

8. The system of claim 1 including said enterprise is a hospital enterprise; and said event monitoring means is a clinical event monitoring system for the hospital enterprise.

9. The system of claim 1 including said event monitoring means having means for generating partial delivery instructions for the message, said partial delivery instructions defining one of the following: (a) at least one of said communication channels to communicate the message, (b) at least one user to receive the message over said at least one of said communication channels, and (c) information corresponding to at least one user to receive the message over said at least one of said communication channels; and said notifier means having means employing the partial delivery instructions for selecting one of: (a) said at least one of said communication channels to communicate the message, and (b) said at least one user to receive the message over said at least one of said communication channels.

10. The system of claim 9 including said partial delivery instructions define one of said communication channels to communicate the message; and said notifier means having means for selecting said at least one user to receive the message over said one of said communication channels.

11. The system of claim 9 including said partial delivery instructions define said at least one user to receive the message over said at least one of said communication channels; and said notifier means having means for selecting said at least one of said communication channels to communicate the message.

12. The system of claim 9 including said partial delivery instructions define the information corresponding to said at least one user to receive the message over said at least one of said communication channels; and said notifier means having means for selecting said at least one of said communication channels to communicate the message.

13. The system of claim 1 including said communication channels include at least two communication channels which are selected from the group consisting of: a paging system, an e-mail system, a telephone channel for facsimile messages, a telephone channel for voice messages, a communication channel to an application containing a ToDo list, and a communication channel to a mobile computing device.

14. The system of claim 1 including said event monitoring means having means for generating the message with a plurality of message types; and said notifier means having database means for storing at least some of the message types and preferences of the users for one of the communication channels to employ with one of said at least some of the message types.

15. The system of claim 14 including said notifier means further having means for modifying said at least some of the message types and said preferences of the users in the database means of said notifier means.

16. The system of claim 1 including said event monitoring means having means for generating the message with a plurality of message types; and said notifier means having database means for storing at least some of the message types and preferences of said users for one of the communication channels to employ with one of said at least some of the message types, said database means including a plurality of dimensions for storing said preferences as a function of representations of the communication channels, said users, said at least some of the message types, and at least one argument selected from the group consisting of: time of day, and the user's role in the enterprise.

17. The system of claim 16 including said enterprise is a medical enterprise having a plurality of patients;

said users are clinicians for the patients;

said message pertains to one of the patients and is communicated to one of the clinicians;

said one of the patients has a setting within the enterprise and a relationship to said one of the clinicians; and said database means further stores the user's preference for the communication channels as a function of said setting and said relationship of said one of the patients.

18. The system of claim 17 including said setting is selected from the group consisting of: inpatient, and outpatient of the medical enterprise.

19. The system of claim 17 including said relationship is selected from the group consisting of: primary doctor, cross-cover doctor, resident, and consultant.

20. The system of claim 1 including said event monitoring means having means for generating the message with a plurality of message types;

each of said communication channels having at least one characteristic with a plurality of states; and said notifier means having first database means for storing and retrieving preferences of said users for at least one of the states of said at least one characteristic of each of said communication channels to employ with at least some of the message types, said first database means including a plurality of dimensions for storing the user's preference for the communication channels as a function of at least the user, said at least some of the message types, and at least one characteristic of each of said communication channels, said notifier means also having second database means for retrieving at least one representation of said communication channels, said second database means including two dimensions for storing representations of said communication channels as a function of said at least one characteristic of each of said communication channels.

21. The system of claim 20 including said enterprise is a medical enterprise having a plurality of patients;

said users are clinicians for the patients;

said message pertains to one of the patients and is communicated to one of the clinicians;

said one of the patients has a setting within the enterprise and a relationship to said one of the clinicians; and said database means further stores the user's preference for the communication channels as a function of said setting and said relationship of said one of the patients.

22. The system of claim 21 including said setting is selected from the group consisting of: inpatient, and outpatient of the medical enterprise.

23. The system of claim 21 including said relationship is selected from the group consisting of: primary doctor, cross-cover doctor, resident, and consultant.

24. The system of claim 1 including said enterprise has a plurality of customers each of which has an account;

said users are account administrators for the accounts; and said message pertains to one of the customers and is communicated to one of the account administrators.

25. The system of claim 24 including said enterprise is a medical enterprise; and said customers are patients of the medical enterprise.

26. The system of claim 1 including one of said users has an identity; and said notifier means having means for selecting one of said communication channels to communicate the message, and having means for determining the identity of said one of said users to receive the message over said one of said communication channels.

27. The system of claim 26 including said notifier means further having communication channel manager means for interfacing said communication channels, and means for formatting the identity of said one of said users to receive the message for said one of said communication channels.

28. The system of claim 1 including said notifier means having means for logging information corresponding to the message communicated over said at least one of said communication channels.

29. The system of claim 28 including the information corresponding to the message communicated over said at least one of said communication channels of said means for logging includes at least one of: an identification of at least one of said users to receive the message over said at least one of said communication channels; a time when the message was communicated over said at least one of said communication channels; an identification of said at least one of said communication channels; the message that was communicated over said at least one of said communication channels; and a unique identification of the message that was communicated over said at least one of said communication channels.

30. The system of claim 1 including said enterprise is a hospital enterprise.

31. The system of claim 1 including said enterprise is a hospital enterprise having patients; and said users include clinicians of the patients.

32. The system of claim 1 including each of said users has at least one role within said enterprise; and said message pertains to one of the roles of said users and is communicated to at least one of said users having said at least one role.

33. The system of claim 20 including said at least one characteristic of said communication channels is a plurality of characteristics which are selected from the group consisting of: time latency, fail-safe operation, security, delivery cost, and capacity of the communication channels.

34. The system of claim 1 including one of said communication channels is a fail-safe communication channel; and said notifier means having a communication channel manager which accepts an acknowledgement from a user of the fail-safe communication channel.

35. A method for notifying users about information or events of an enterprise, said method comprising:

receiving information as received information;

storing the received information as stored information;

employing the stored information for determining an event and generating a responsive message;

employing a plurality of communication channels for communicating the message; and selecting at least one of said communication channels to communicate the message as a function of the message and a user's preference for said at least one of said communication channels to communicate the message.

36. The method of claim 35 including generating partial delivery instructions for the message;

employing one of the following in said partial delivery instructions: (a) at least one of said communication channels to communicate the message, (b) at least one user to receive the message over said at least one of said communication channels, and (c) information corresponding to at least one user to receive the message over said at least one of said communication channels; and employing the partial delivery instructions for selecting one of: (a) said at least one of said communication channels to communicate the message, and (b) said at least one user to receive the message over said at least one of said communication channels.

37. The method of claim 36 including defining said at least one of said communication channels to communicate the message with said partial delivery instructions; and employing the partial delivery instructions for selecting said at least one user to receive the message over said at least one of said communication channels.

38. The method of claim 36 including defining said at least one user to receive the message over said at least one of said communication channels with said partial delivery instructions; and employing said partial delivery instructions for selecting said at least one of said communication channels to communicate the message.

39. The method of claim 36 including defining the information corresponding to said at least one user to receive the message over said at least one of said communication channels with said partial delivery instructions; and employing said partial delivery instructions for selecting said at least one of said communication channels to communicate the message.

40. The method of claim 35 including generating the message with a plurality of message types; and storing in a database at least some of the message types and preferences of said users for one of the communication channels to employ with one of said at least some of the message types.

41. The method of claim 40 including storing in the database said preferences as a function of representations of the communication channels, said users, said at least some of the message types, and at least one argument selected from the group consisting of: time of day, and the user's role in the enterprise.

42. The method of claim 35 including generating the message with a plurality of message types;

employing at least one characteristic with a plurality of states with each of said communication channels;

employing a first database with a plurality of dimensions for storing the user's preference for said communication channels as a function of at least the user, some of the message types, and said at least one characteristic of each of said communication channels;

storing preferences of said users in the first database for at least one of the states of said at least one characteristic of each of said communication channels to employ with at least some of the message types;

retrieving the preferences of one of said users from the first database for one of said at least some of the message types;

employing a second database with two dimensions for storing representations of said communication channels as a function of said at least one characteristic of each of said communication channels; and employing said preferences of said one of said users to retrieve at least one representation of said communication channels from the second database.

43. The method of claim 35 including employing a user having an identity to receive the message over said at least one of said communication channels;

determining the identity of said user to receive the message over said at least one of said communication channels; and selecting one of said communication channels to communicate the message.

44. A system for notifying users about events of an enterprise having information, said system comprising:

event monitoring means employing the information of said enterprise for determining an event and generating a message having one of a plurality of types;

a plurality of communication channels for communicating the message; and notifier means cooperating with said event monitoring means for selecting zero or at least one of said communication channels to communicate the message as a function of a user's preference for the type of the message and said communication channels to communicate the message.

45. The system of claim 44 including said notifier means having database means for storing at least some of the message types and preferences of the users for one of the communication channels to employ with one of said at least some of the message types.

46. The system of claim 44 including said notifier means having database means for storing at least some of the message types and preferences of the users for zero or at least one of said communication channels to employ with said at least some of the message types; and said preferences include a preference for non-communication of at least one of the message types.

47. A notifier for use with an event monitor to notify users about an event of an enterprise, said event monitor determining the event and generating a message responsive thereto, said notifier comprising:

means for receiving the message from said event monitor;

a plurality of communication channels for communicating the message; and means for selecting at least one of said communication channels to communicate the message as a function of the message and a user's preference for said at least one of said communication channels to communicate the message.

48. The notifier of claim 47 including said means for selecting including means for determining at least one user to receive the message over said at least one of said communication channels as a function of the message.

* * * * *